(12) United States Patent
Mondragon et al.

(10) Patent No.: US 11,430,444 B2
(45) Date of Patent: *Aug. 30, 2022

(54) SYSTEMS AND METHODS FOR A WIRELESS MICROPHONE TO ACCESS REMOTELY HOSTED APPLICATIONS

(71) Applicant: nVoq Incorporated, Boulder, CO (US)

(72) Inventors: David Mondragon, Boulder, CO (US);
Michael Clark, Boulder, CO (US);
Jarek Foltynski, Boulder, CO (US);
Charles Corfield, Boulder, CO (US)

(73) Assignee: nVoq Incorporated, Boulder, CO (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/565,990

(22) Filed: Sep. 10, 2019

(65) Prior Publication Data

US 2020/0075014 A1    Mar. 5, 2020

Related U.S. Application Data

(63) Continuation of application No. 14/744,914, filed on Jun. 19, 2015, now Pat. No. 10,418,034.

(60) Provisional application No. 62/015,195, filed on Jun. 20, 2014.

(51) Int. Cl.
| | |
|---|---|
| *G06Q 10/10* | (2012.01) |
| *H04L 9/40* | (2022.01) |
| *H04L 67/01* | (2022.01) |
| *H04L 67/10* | (2022.01) |
| *H04W 12/06* | (2021.01) |
| *G10L 15/26* | (2006.01) |

(52) U.S. Cl.
CPC .............. *G10L 15/26* (2013.01); *G06Q 10/10* (2013.01); *H04L 63/08* (2013.01); *H04L 67/10* (2013.01); *H04L 67/42* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 6,434,524 | B1 | 8/2002 | Weber |
| 9,345,061 | B1 * | 5/2016 | Evans ..................... G06F 3/165 |
| 2002/0178003 | A1 | 11/2002 | Gehrke et al. |
| 2004/0203768 | A1 | 10/2004 | Ylitalo et al. |
| 2006/0190265 | A1 | 8/2006 | Kurganov et al. |
| 2007/0082668 | A1 | 4/2007 | Silver et al. |
| 2007/0208563 | A1 | 9/2007 | Rothschild |
| 2008/0064371 | A1 | 3/2008 | Madhavapeddi et al. |
| 2008/0097851 | A1 | 4/2008 | Bemmel et al. |
| 2008/0162133 | A1 | 7/2008 | Couper et al. |
| 2008/0300886 | A1 | 12/2008 | Patch |

(Continued)

*Primary Examiner* — Richa Mishra
(74) *Attorney, Agent, or Firm* — Perkins Coie LLP

(57) ABSTRACT

The technology of the present application provides software as a service (SaaS) executing on a server in a cloud or network. The SaaS receives data from a mobile device of a user over the network. The SaaS processes the data and returns the processed data to a client application executing on a client device of the user, which user is the same as the user of the mobile device wherein there is no direct communication link, wireless or wired, between the mobile device and the client device. In one aspect, the technology of the present application provides the mobile device as a smartphone and a microphone application to be executed on the smartphone.

18 Claims, 11 Drawing Sheets

(56) References Cited

U.S. PATENT DOCUMENTS

| | | |
|---|---|---|
| 2009/0006612 A1 | 1/2009 | Asai |
| 2009/0021366 A1* | 1/2009 | Hammond ............. H04L 67/10 |
| | | 340/539.1 |
| 2009/0030696 A1 | 1/2009 | Cerra et al. |
| 2009/0052635 A1 | 2/2009 | Jones et al. |
| 2009/0117945 A1 | 5/2009 | Mahler et al. |
| 2009/0315867 A1 | 12/2009 | Sakamoto et al. |
| 2011/0131291 A1 | 6/2011 | Hon-Anderson |
| 2012/0245980 A1 | 9/2012 | Cook |
| 2012/0278093 A1* | 11/2012 | Amundson ............ G06Q 40/08 |
| | | 705/2 |
| 2012/0284027 A1 | 11/2012 | Mallett et al. |
| 2012/0330661 A1 | 12/2012 | Lindahl |
| 2013/0090928 A1 | 4/2013 | Rose et al. |
| 2013/0231055 A1* | 9/2013 | Leroux ............... H04M 1/6066 |
| | | 455/41.2 |
| 2013/0316696 A1 | 11/2013 | Huang et al. |
| 2014/0163995 A1 | 6/2014 | Burns et al. |
| 2014/0282728 A1 | 9/2014 | Matsunaga |
| 2015/0052591 A1 | 2/2015 | Miura et al. |
| 2015/0162003 A1* | 6/2015 | Zhai ..................... G10L 15/26 |
| | | 704/235 |
| 2015/0350221 A1 | 12/2015 | Espinosa |

\* cited by examiner

SYSTEMS AND METHODS FOR A WIRELESS MICROPHONE TO ACCESS REMOTELY HOSTED APPLICATIONS

CLAIM OF PRIORITY UNDER 35 U.S.C. §§ 119 AND 120

The present application is a continuation of U.S. patent application Ser. No. 14/744,914 filed Jun. 19, 2015, which claims priority to U.S. Provisional Patent Application Ser. No. 62/015,195, filed Jun. 20, 2014, the disclosure of which are incorporated herein by reference as if set out in full.

REFERENCE TO CO-PENDING APPLICATIONS FOR PATENT

None.

BACKGROUND

Field

The technology of the present application relates generally to a wireless microphone, or other wireless input device, such as a mouse, keyboard, pen, touch screen, sensor, or the like that accesses a remotely hosted application, and more particularly, to wireless microphones or devices connectable directly to a network to interact with a remotely hosted application such that the wireless device provides input to or commands to the remotely hosted application that are subsequently displayable or operable on a client device, which is separate from the wireless microphone, and separately connected to the remotely hosted application.

Background

Microphones and computing devices have co-existed for many years in a variety of form factors. The microphones may be internal, as is the case with smartphones, tablets, and notebooks; or as a plug-in peripheral, as is the case with desktops and laptops; or wireless, with a plug-in receiver for the local computer. Applications that process the audio from the microphone have conventionally been co-resident with the microphones on the local computer. In each case, the microphones interact directly with the computing device to which it is connected.

A dictation/transcription application is one example of an application running on a computing device that may receive input from the microphones and output text for display in either a text file, an editable field in a database, a user interface, or the like. Until recently, this type of application required a tight coupling between the microphone operationally coupled to a local computing device and the dictation/transcription application resident on the same local computing device. This necessitated a thick, heavy, or fat client machine as it was required to have the processing capacity to process the audio from the microphone and process the speech-to-text engine necessary to convert the audio from the microphone into text.

With reference to FIG. 1, a conventional thick client computing device 100 (sometimes referred to simply as thick client 100 or computing device 100) is shown where an application 102 is running on the computing device 100 that is directly or locally coupled to an input 104, such as, for example, a microphone 106, mouse 108, or keyboard (where the keyboard is not specifically shown). Notice the input 104 could include a number of other devices such as for example, an optical pen, a touch screen, or the like as are generally known in the art. The conventional thick client 100 also has a monitor 110 that may display an interface or text document to accept and display the data input through the input 104 or a processed version of the data input through the input 104. As can be appreciated, the thick client 100 and the application 102 running on the thick client 100, which may provide a display 112 on the monitor 110, receives audio 114 from a user that is transmitted directly to the application 102 via the microphone 106. If the application 102 is, for example, a dictation application, the audio 114 could be converted by the application 102 running on the thick client 100 into text that would be displayed on display 112 in a Microsoft Word document or a text field. Thus, the user speaks into the microphone 106 that transmits the audio 114 to the thick client 100 via a cable or wireless network connection 116. The application 102 running on the thick client 100 receives the audio 114 and performs some operation and the results (optionally) are displayed on the display 112, which could be a computer screen or monitor, a print out, a sound out, or the like. In some instances, the results may be transmitted back over the wireless network connection 116 to be displayed on a display of the input 104 should the input 104 be equipment with a screen and processors for such display. Essentially, as is generally understood by the terminology of a thick client, the microphone, application, and various computer components are all co-resident in one computing environment regardless of how the peripherals, such as the microphone 106 and display 112 are connected to the computing device 100. The connections could include a direct, wired coupling or a local wireless protocol such as, for example, Bluetooth, Wi-Fi, a LAN, a WAN, a cellular network, a WLAN, other IEEE 802.xx networks, the Internet or the like.

The microphone 106 associated with thick client 100 may be a wired or wireless microphone. In both cases, the microphone 106 transmits data to the client device 100. The microphone 106 may be an application resident on a smartphone or the like that may include, for example, a Bluetooth or Wi-Fi connection to the client device having an installed copy of Dragon Dragon Naturally Speaking®. The application converts a smartphone to a wireless microphone that transmits audio to the local client device.

With the Internet, it wasn't long before applications were no longer necessarily running or resident on the local computing device. In the case of the above referenced exemplary dictation/transcription application, the speech-to-text conversion engine or application module may be resident on a remote computing device that hosts the application. Typically, the remote computing device is more computationally powerful than the local workstation or client station. This is commonly referred to as a client computing device. In such an exemplary system, the audio is received by a microphone that is operationally coupled to a client device. The client device directs, via conventional network connection protocols, to the hosted application that processes the audio to text using the speech-to-text conversion engine and returns the text to the networked client device. The client device typically has a display onto which the results of the application's processing is displayed. Still, as described above, the microphone, whether wired or wireless, is tightly coupled to the client device, which may now be a thin client as the application is remotely hosted by a more powerful processor.

With reference to FIG. 2, a hosted or server application 202 is resident on a server 204 that may be remote from the client device 200 (sometimes referred to generically as client 200). The hosted application 202 and server 204 is visually depicted as in the cloud 201 as is generally understood in the art. In some applications, the architecture of FIG. 2 may be considered a thin client architecture. Thin client, in this context, means the user interacts with an application on a first computing device (client device 200 here) and a second computing device (server 204), typically remote from the first computing device performs some or a majority of the processing. Further, FIG. 2 shows the hosted application 202 as a Software as a Service application (or "SaaS"), SaaS is simply one common exemplary type of hosted application. The client device 200 receives data from an input 104 similar to the above that is operatively coupled to the client device 200, which is a thin client device in this exemplary embodiment but could be a fat client device. The client device 200 typically includes the monitor 110 that may project a display on the display 112 of the monitor 110. The data returned from the server application 202 may be a text document, in the case of certain types of dictation/transcription applications, or input to a graphical user interface displayed on the display 112, a result based on data entered into the graphical user interface, or the like. As can be appreciated, the change in relationship between the components of FIGS. 1 and 2 happens with network based applications, where the network based application is private or public. In a public environment, such applications may be referred to as Software as a Service or "SaaS" as mentioned above. Generally, SaaS is split into two pieces, a heavy-weight hosted application 202 running on a server 204 in a remote data center, and a light-weight client application 206 running on the client device 200 (while shown for convenience on the monitor 110) the client application 206 would be operating to cause the processor 203 of the thin client 200 to execute instructions. In our exemplary embodiment, where the hosted application 202 is a speech-to-text engine, the user speaks into the microphone 106 that is operatively connected to the client application 206 running on the client device 200. The client application 206 directs the audio to the hosted application 204 that processes the user's audio and sends instructions and data to the client application 206. Similarly to the above, the peripherals to the client device 200 may be connected to the client device 200 by cable, Bluetooth, or Wi-Fi. Distributed transcription systems are further described by, for example, U.S. Pat. No. 8,150,689, titled Distributed Dictation/Transcription System, which issued Apr. 3, 2012, and U.S. Pat. No. 8,311,822, titled Method and System of Enabling Intelligent and Lightweight Speech to Text Transcription Through Distributed Environment, which issued Nov. 13, 2012, both of which are incorporated herein as if set out in full.

The microphone 106 associated with thick client 100 or client 200 may be a wired or wireless microphone. In both cases, the microphone 106 transmits data to the local client device 100, 200. The microphone 106 may include, for example, a Bluetooth or Wi-Fi connection to the client device. One such application includes the Dragon Remote Microphone Application that interfaces through a networking protocol with a client device having an installed copy of Dragon Naturally Speaking®. The application converts a smartphone to a wireless microphone that transmits audio to the local client device. Another application that is downloadable to a smartphone is Philips dictation recorder available from Koninklijke Philips N.V. The Philips dictation recorder, however, is different from the Dragon Remote Microphone Application in that it is usable as a conventional Digital Audio Recorder. At the end of which, the audio file is transmitted by the client device 200 to a server application for batch transcription. The transcription is emailed once finished back to the user.

For remotely hosted engines processing the speech to text, the audio is processed by the server executing the hosted application. Therefore the audio has to be sent from the client device to the server, often over a public network, such as the Internet. Sometimes this is a problematic. In one aspect, the audio rebroadcast by the client device to the server executing the hosted application may be of inferior quality due to the retransmission. For example, when the bandwidth from the client device to the server is poor, the connection interferes with the delivery of the audio to the server. In another example, the audio may be received by the client device, but the client device cannot deliver the audio to the server for processing. Another potential problem in this deployment scenario occurs when the user is in a secure environment, such as a hospital, which only grants Wi-Fi access to registered devices, which may preclude the microphone 106 from establishing a direct connection needed to the client device 200. These are but some examples of potential problems associated with using a wireless microphone with the architecture in FIG. 2.

The conventional thick client and client applications where audio is used as an input are problematic in view of some of the issues above. There may be added difficulty in that the ability of the application to function often depends on the quality of the audio input received. Often, the thick client or client device 100 or 200 is delivered with a built in microphone 106. The results of using a built in microphone 106 are typically poor because audio fidelity was not the primary factor considered when sourcing the microphone. The quality of built in microphones has traditionally been a low priority for device manufacturers. Device manufacturers often choose a microphone component based primarily on its low cost and require only that the microphone be able to function at minimally acceptable levels for miscellaneous use. Because the quality of the device's microphone has traditionally been a low priority for consumers, device manufacturers prefer to save money on the microphone and put that money into component(s) more highly valued by consumers, such as display size or quality, or speaker clarity or loudness. Thus, users of applications that receive audio often grow frustrated with the results of the applications because the application (or applications) does not appear to work properly. However, in these situations, it may be the microphone that is causing the problems in operation without the knowledge of the user. Sometimes the thick client or client device is not provided with a built in microphone. The user is required to purchase a microphone separately when one is not built into the computing device. The user typically does not know how to select a suitable microphone for the intended use and is likely to purchase one which yields poor results. Moreover, quality microphones that enhance the audio quality are sometime expensive, and may be prohibitively expensive in certain situations. Therefore, the user encounters a similar problem in that quality of the audio is poor and the associated applications do not function properly. However, many users in fact already own a microphone with sufficient audio fidelity to achieve good results with the applications. This microphone is in their smartphone, such as an iPhone 5S. The audio transmission from the smartphone microphone may be of sufficient audio quality, but the retransmission from the client device to the server executing the host application compromise the quality of the audio. However, users do not have an easy way to connect the microphone from the smartphone directly to the server executing the hosted application such that the server transmits the results to the client's workstation, separate from returning the results directly to the smartphone.

Moreover, the above referenced smartphone applications while useful, are less than satisfactory solutions to providing a good, wireless microphones for the architectures described in FIGS. 1 and 2 above. In particular, the smartphone wireless microphone applications use a Wi-Fi connection the client device. It is difficult, at best, to successfully network the smartphone wireless to the client application on the client device.

Thus, against this background, it is desirable to provide an improved wireless microphone to provide audio input to remotely hosted applications and in particular to be able to use a smartphone's built-in microphone for a separate client workstation or device receiving the results of the remotely hosted applications.

SUMMARY

To attain the advantages and in accordance with the purpose of the technology of the present application, methods and apparatuses to improve audio quality and transmission of the audio to a remotely hosted application are provided. The technology of the present application provides a wireless microphone that transmits audio to the remotely hosted application, wherein the wireless microphone has a first locator, such as a first IP address. The technology of the present application further provides for the remotely hosted application to transmit data or commands, which may process data based on the audio or commands based on the audio, to a client device having a second IP address different from the first IP address. In certain aspects, the wireless microphone, having a first IP address, does not directly input data to the client device, having a second IP address.

In certain aspects, the technology of the present application provides a Smartphone or mobile device as the wireless microphone. The Smartphone or mobile device connects to a remotely hosted application through either a cellular network and an IP network, such as the Internet, or directly through the IP network in the case of, for example, Smartphones that are Wi-Fi or Bluetooth enabled. In certain aspects, the remotely hosted application receives and converts the audio, in other words processes the audio, in accordance with the execution of the hosted application on the server. The processed audio, or data, is transmitted to a separate client device for use, which use may be to populate an editable field in a database or graphical user interface, to provide a text document, to execute a command, or the like.

In other aspects, the technology of the present application provides a wireless microphone application on a smartphone that transmits audio to a remotely hosted application for processing, which processed audio is transmitted to a client device that is not the smartphone for display.

The foregoing and other features, utilities and advantages of the invention, will be apparent from the following more particular description of a preferred embodiment of the invention as illustrated in the accompanying drawings.

BRIEF DESCRIPTION OF THE DRAWINGS

Various examples of the technology of the present application will be discussed with reference to the appended drawings. These drawings depict only illustrative examples of the technology and are not to be considered limiting of its scope, which is defined by the claims.

DETAILED DESCRIPTION

Figure 1:
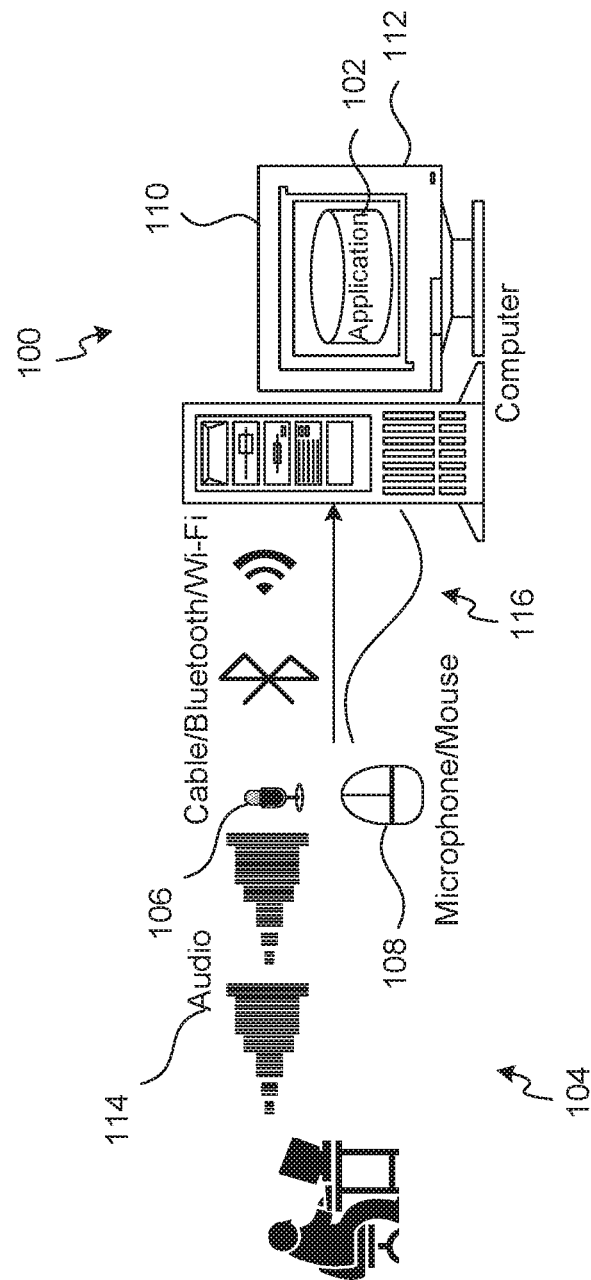
FIG. 1 is a functional block diagram of a thick client having an audio input to a local application on a local processor.
Figure 2:
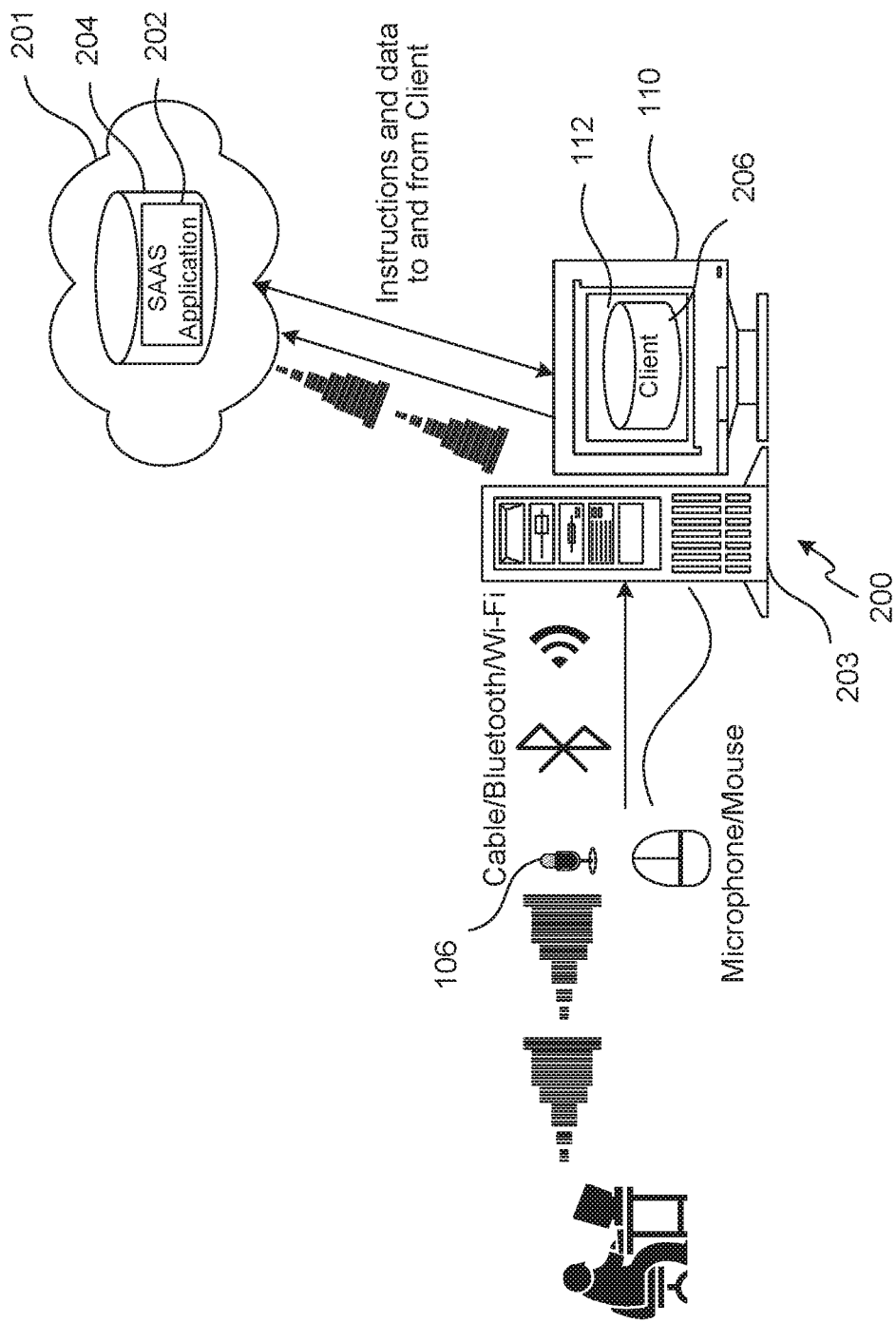
FIG. 2 is a functional block diagram of a client having an audio input to a local processor that transmits and receives data with a remote server and a remotely hosted application.

The technology of the present application will now be explained with reference to the figures. While the technology of the present application is described with relation to a remotely hosted application such as a speech recognition engine, one of ordinary skill in the art will recognize on reading the disclosure that the technology of the present application is usable with other remotely hosted applications that receive audio or other device input and executes instructions stored in a memory where the execution of instructions may process the audio for input as data to a program or as a command to execute some function or application.

The technology of the present application will be described with reference to particular discrete processors, modules, or parts, but one of ordinary skill in the art will recognize on reading the disclosure that processors may be integrated into a single processor or server, or separated into multiple processors or servers. Moreover, the technology of the present application will be described generically and portions of the present application may be loaded onto a particular user's client device or hosted by a server that is accessed by the client device or devices. Additionally, the technology of the present application is described with regard to certain exemplary embodiments. The word "exemplary" is used herein to mean "serving as an example, instance, or illustration." Any embodiment described herein as "exemplary" is not necessarily to be construed as preferred or advantageous over other embodiments. All embodiments described herein should be considered exemplary unless otherwise stated. In one aspect, the technology of the present application solves the technical problem of directly broadcasting audio of sufficient quality from a wireless microphone to a remote server hosting an executing application and returning the results, in real time, to a separate client device without, necessarily, a direct wireless communication link through a network between the wireless microphone and the client device.

For reference, the technology of the present application provides a workstation that comprises a client device or computer. The client device or computer may be a desktop computer, a laptop computer, a tablet computer, a smartphone, a thin client terminal, or the like. The technology also provides an input device such as a wireless microphone where the wireless microphone may be the microphone in a conventional smartphone or tablet. The wireless microphone may be referred to as the wireless microphone, mobile device, or smartphone. Generally, with regard to the wireless microphone, smartphone and tablet may be used interchangeable. The technology also provides for other input devices or emulators such as virtual keyboards, mice, pens and other sensors, which may also be associated with applications running on a smartphone, or tablet computer. Without loss of generality, the description of the technology will use the microphone as the exemplar input device. The smartphone will typically be running an application to allow the wireless microphone to interact with the remotely hosted applications. The application on the smartphone may be referred to as an "APP". The remotely hosted application is hosted on a server that is typically, but not necessarily, remote from both the smartphone and the client device. The remotely hosted application also interacts with a client application operating on the client device.

Figure 3:
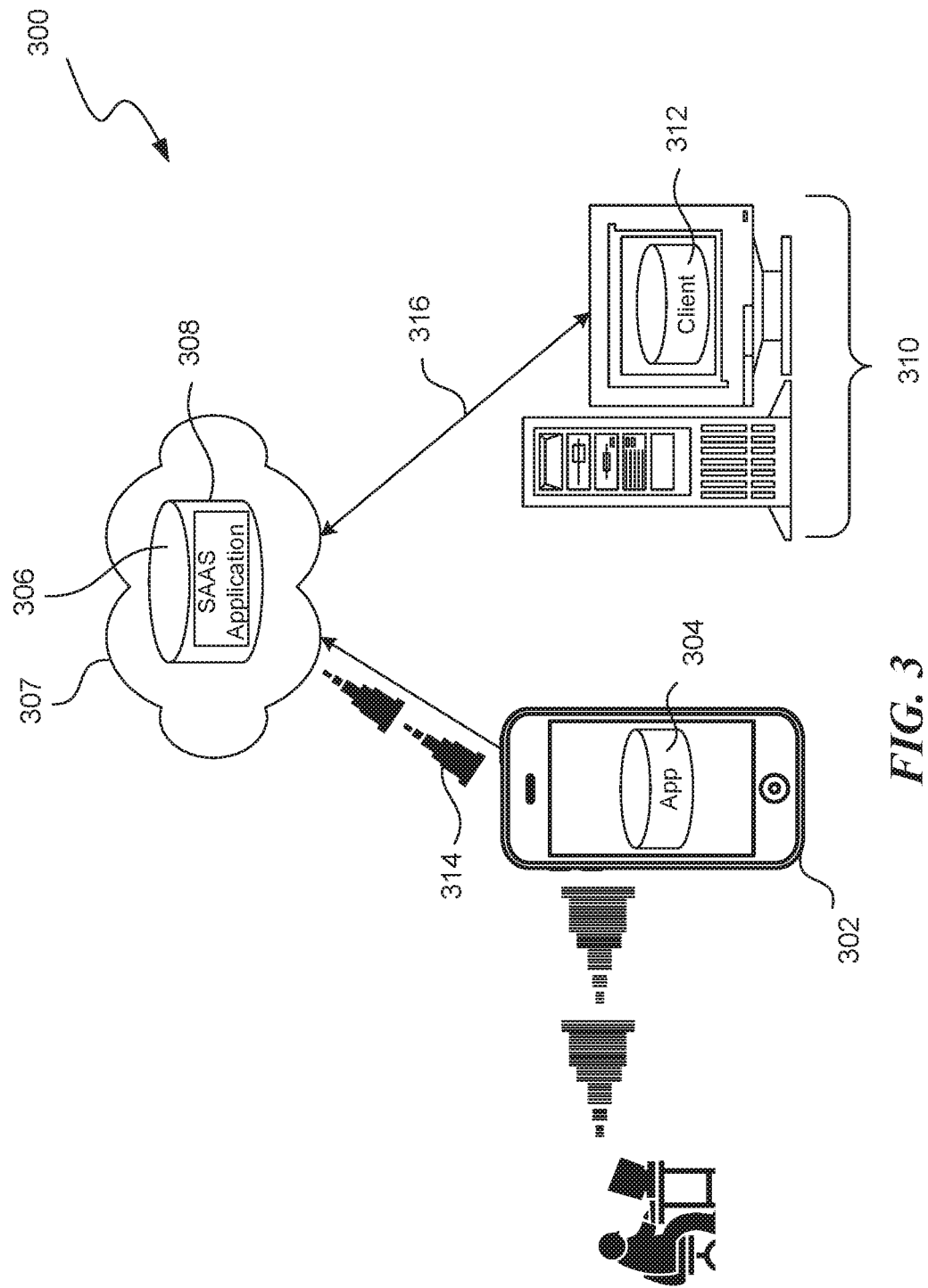
FIG. 3 is a functional block diagram of a cloud based computer operating configuration consistent with the technology of the present application.

Referring now to FIG. 3, the technology of the present application will now be explained in detail with reference to system 300. System 300 shows overall operation of the technology of the present application. System 300 includes a wireless microphone 302, which could be, for example, any conventional smartphone. The smartphone is a device that has both cellular and Internet connectivity generally and has a processor that executes instructions and applications running on the smartphone. The wireless microphone 302, however, does not require both the cellular and the internet connectivity. For example, a tablet could function as wireless microphone 302 and tablets may or may not have cellular connectivity associated with them. Alternatively, the wireless microphone 302 may only include cellular connectivity as will be explained below. The wireless microphone 302 generally includes an APP 304 to allow the wireless microphone 302 to function as a wireless microphone as required for system 300. System 300 also includes a server 306 hosting an application 308, which may be a SaaS application. The server 306 and hosted application 308 may be considered to be in the cloud 307. The server 306 includes a processor and a memory where the memory comprises instructions, such as the hosted application 308, which the processor can execute. The APP 304 executing on the wireless microphone facilitates the transfer of the audio from the wireless microphone 302 to the server 306 for use by the hosted application 308. The server 306 processes the instructions associated with hosted application 308 to process data or commands. Finally, system 300 includes a client device 310 executing a client application 312. The client device 310 need only be of sufficient capability to execute the instructions of the client application 312 to allow interfacing with the server 306 and the hosted application 308. However, the client device 310 can be of more and in some cases significantly more computational power. The client device 310 includes a processor and a memory where the memory comprises instructions, such as the client application 312, that the processor can execute.

The wireless microphone 302 is coupled to the server 306 and the hosted application 308 through a first communication link 314. The first communication link 314 may be via the cellular connectivity to the hosted application 308, which first communication link 314 may include a cellular tower, a media gateway, or the like, and a network connection to the hosted application where the network connection is the Internet, although a private network could be used as well. The first communication link 314 also may be via a wireless connection to the network, which first communication link 314 may include a Wi-Fi router or similar other wireless connections to the internet. The client device 310 also is connected to the server 306 and the hosted application 308 through a second communication link 316. Generally second communication link 316 will be through the internet and may include a wireless connection to the client device 310 to a Wi-Fi router. However, in certain embodiments, for example, when the client device is a smartphone or tablet, the second communication link 316 may be through a cellular network as well, however, in most embodiments, an audio and data transport network is acceptable for most applications. As one of ordinary skill in the art will recognize now on reading the disclosure, the wireless microphone 302, the server 306, and the client device 310 all have separate IP addresses or resource locater data (such as a URL). With reference back to the example of a speech to text engine, the smartphone 302 provides a microphone application that connects via the first communication link 314 to the hosted application 308 on the server 306, preferably with a network connection. The audio is received as spoken by the user at the smartphone 302 and transmitted via the first communication link 314 to hosted application, which in this example is a speech to text engine. The host application 308 converts the audio to a text file and transmits via the second communication link 316 the text file to the client device 310 that may display on the monitor 318 the text file via the client application 312, which may be, for example, a text editor or the like. As can be appreciated, the audio data transmitted by the wireless microphone 302 is not directly transmitted to the client device 310. Thus, there does not need to be a communication link between the wireless microphone 302 and the client device 310.

Of course, FIG. 3 shows a single wireless microphone 302 and a single client device 310. It is envisioned that a plurality of wireless microphones 302 and a plurality of client devices 310 will be connected to the hosted application 308 (or several instances of the hosted application 308). Thus, the various components typically register both the wireless microphone 302 (or the APP 304) and the client device 310 (or the client application 312) with the hosted application 308 such that the audio from the wireless microphone 302 is directed to the client device 310. While the first and second communication links can be accomplished using a variety of networking protocols, the technology of the present application is generally described using HTTP.

Figure 4:
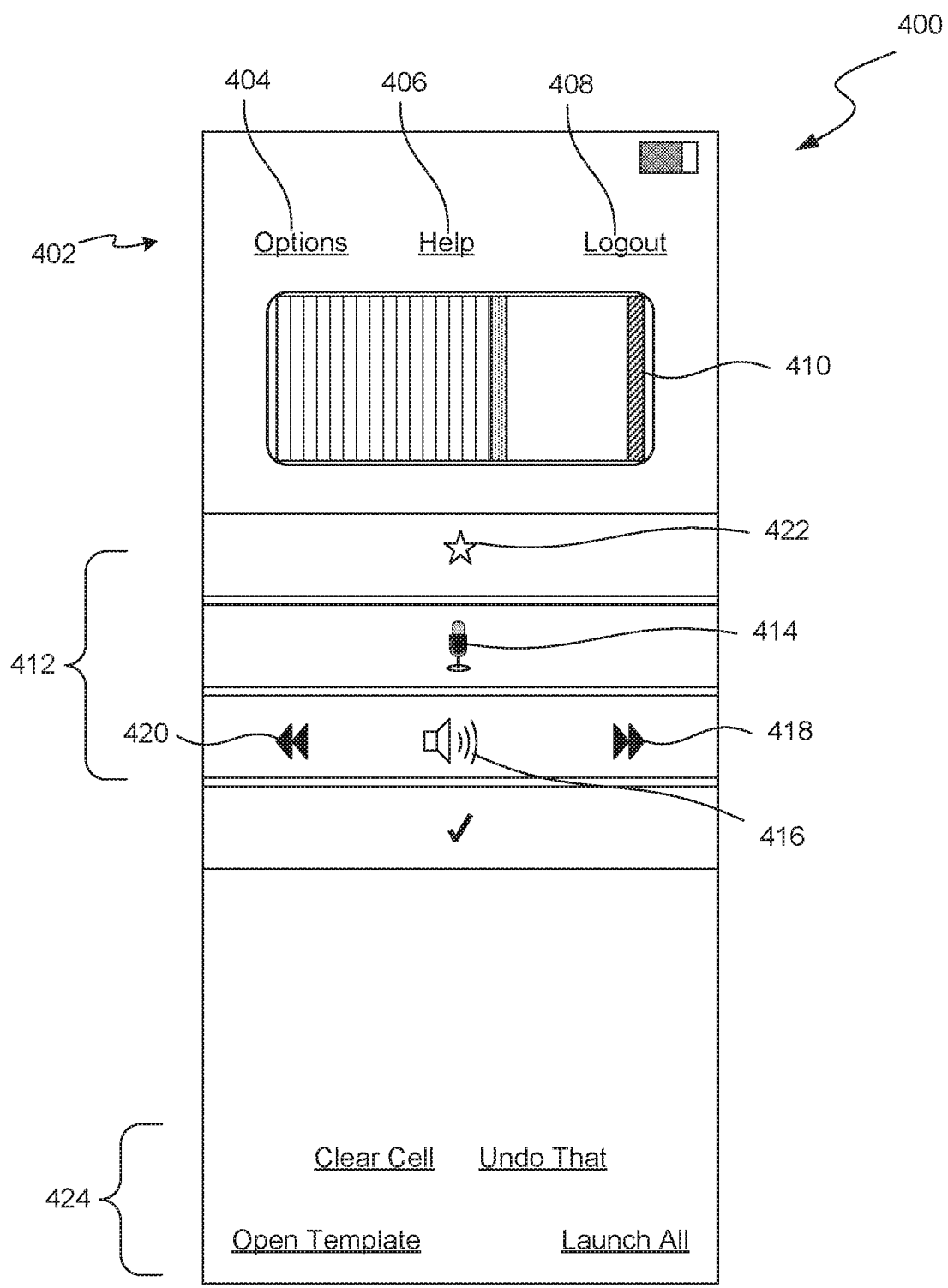
FIG. 4 is a graphical user interface of a wireless microphone application consistent with the technology of the present application.

First, the wireless microphone 302 and the APP 304 are described in some detail. The technology of the present application uses a smartphone (or tablet) as the wireless microphone 302, in one exemplary embodiment, in part because the microphones for smartphones and tablets tend to have a good audio quality, including for example, noise cancellation and the like. Also, smartphones are becoming ubiquitous, and most operators will already have a good audio quality microphone in their smartphone that is likely better than any microphone built into their computer or one they would buy. With that in mind, the APP 304 is downloaded and installed on a smartphone wireless microphone 302, which provides a graphical user interface (GUI) 400 as shown in FIG. 4. In certain embodiments, the graphical user interface may be an enterprise productivity or office automation application. While not specifically shown, in certain embodiments, the GUI 400 may include a display for the results of the processed data. In this exemplary GUI 400, a menu bar 402 may be provided, as shown the menu bar 402 is provided at the top of the GUI 400 as is conventional with smartphone app features. The menu bar 402 may include items, such as an options tab 404, a getting help tab 406, and a logging in/out tab 408, which allows the user to provide the necessary credentials to the hosted application 308 on the server 306. For reference, tabs and buttons are generally used interchangeably herein. The hosted application 308 uses the credentials that have been separately submitted from the APP 304 and the client application 312 to be associated. As can now be appreciated, the client device 310 and the client application 312 do not need to be "on-line" for the APP 304 to transmit data to the hosted application 308. In general, it is not required that the client application 312 be running as it is sufficient for the hosted application 308 to process the audio by itself. As will be explained below, when the client device 310 and the client application 312 are initiated, the client application polls the hosted application 308 and any data is downloaded (similar to a batch transcription for example). In other embodiments, of course, a real time stream from the wireless microphone, to the host server, to the client device may be established. Other functions illustrated here are an audiometer 410 that tells the user how quietly/loudly he is speaking. The audiometer 410 is shown as a bar graph that fills as the volume of the speaker increases or decreases, but the audiometer 410 could be replaced with a numerical indication, such as a percentage or a decibel number. In other embodiments, the audiometer 410 may simply a word or phrases, such as "too quiet", "too loud", or "volume ok", or the like.

The GUI 400 also may include a collection of buttons 412 for handling voice capture and review. The buttons may include a record button 414, such as the microphone button shown, a listen button 416, such as the speaker button shown, a forward button 418 and a rewind button 420 (or reverse/backwards button). The forward and rewind buttons may have fast versions and skips or the like. To facilitate forward and rewind, the audio transmitted from the wireless microphone may be tagged and the subsequent text transmitted to the client device may be similarly tagged such that, for example, a rewind command can be coordinated with text transmitted to the client device. In this exemplary embodiment, the GUI 400 also provides a shortcut button 422, as shown by the star button. The shortcut button 422 may bring up a menu with other options or provide for voice activation or commands. The voice command, as will be explained below may be transmitted to the client device 310 for execution. Additional buttons 424 may be provided to which different commands/actions can be assigned. Generally, the GUI 400 features/functions illustrated here would be familiar to a user of an existing handheld microphone, such as a Philips SpeechMike®, or a Digital Audio Recorder PowerMic®, which also provide buttons for recording audio (dictating) and navigating applications (mouse and keystroke emulation).

Figure 5:
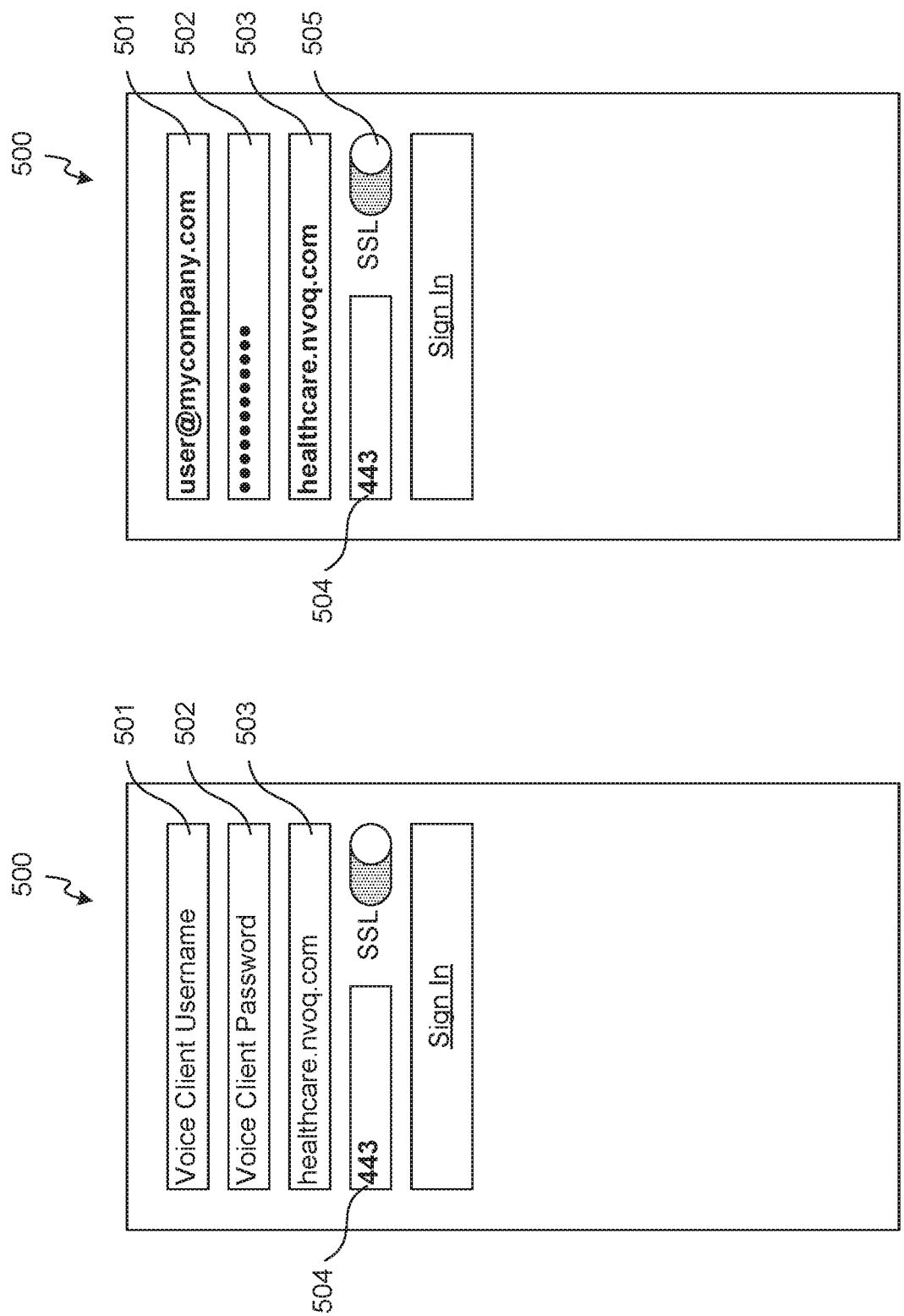
FIG. 5 is a graphical user interface of the wireless microphone of FIG. 4 showing an exemplary login consistent with the technology of the present application.

For completeness, with refer to FIG. 5, the GUI 400 is shown when the logging in/out tab 408 has been selected. The log in graphical user interface 500 allows the APP 304 to gather the necessary information to associate the session on the wireless microphone 302 with the user of the hosted application 308. In this exemplary case, the APP 304 gathers the user's credentials (User ID 501 and Password 502) as well as the IP address 503 (and port 504) of the hosted application 308, which in this exemplary embodiment is a speech to text workflow application such as, for example, the SayIt™ application available from nVoq, of Boulder Colo. This example also allows the user to specify that an encrypted connection be used (the "SSL" option on/off button 505). The client application 312 may have a similar login graphical user interface 500 such that the hosted application 308 can capture the necessary information and associate the wireless microphone and the client device.

Figure 6:
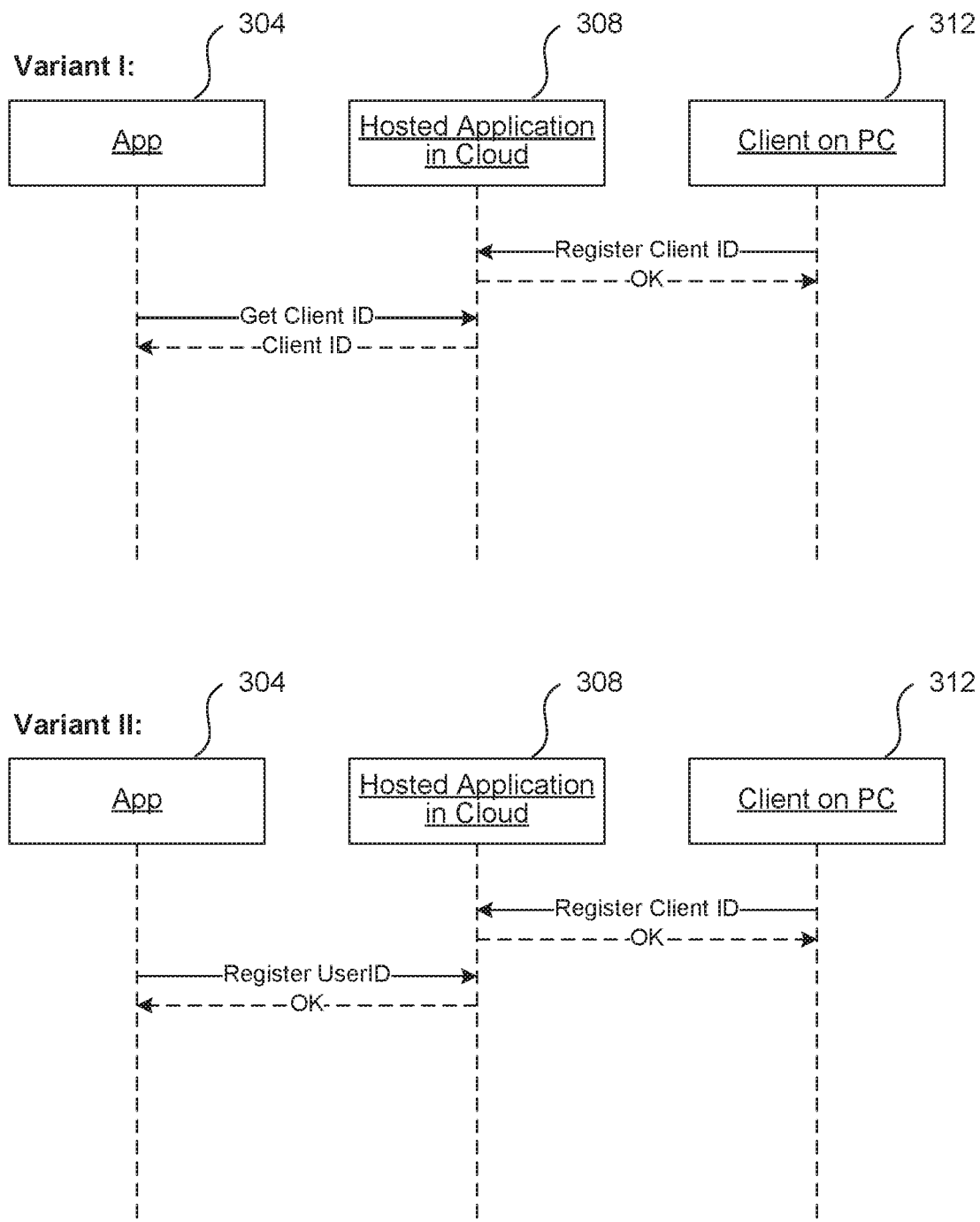
FIG. 6 is a flow/sequence diagram for registering the cloud based computer operating configuration consistent with the technology of the present application.

With the appropriate information, as explained with reference to FIG. 5, it is possible to connect the APP 304 on the wireless microphone 302 and the client application 312 on the client device 310 through the hosted application 308 on the server 306. In other words, for purposes of the described technology, the wireless microphone 302 does not send data directly to the client device 310. For purposes of the technology of the present application, in one aspect, the wireless microphone not being directly connected (or not transmitting data directly) to the client device means an intermediate processor, which in this case in the server, routes the data from one device to the other. Additionally, the intermediate processor processes the data to provide a result or command to the client device. The client device may, in certain embodiment, receive the data transmitted by the wireless microphone unprocessed. With reference to FIG. 6, the APP 304 on the smartphone wireless microphone 302 and the client application 312 on the client device 310 register their presence with the hosted application 308 in the cloud (which could be any of a plurality of servers 306 hosting hosted application 308). The registrations provide sufficient information for the hosted application 308 to ascertain that the same (or at least an authorized) user is associated both with the APP 304 and the client application 312. There are various methods for the registration. In the first variant, the client application 312 on the client device 310 registers with the hosted application 308 and the APP 304 polls the hosted application 308 for the client application's 313 ID, which it uses when submitting transcription, shortcut, or command requests (which command requests will be explained below). In the second variant, both the client application 312 and the APP 304 register themselves with the hosted application 308, and the hosted application 308 makes the association between the APP 304 and the client application 312 so that the results of handling transmitted data from the APP 304 are sent to the appropriate client application 312. The smartphone and the client device are fungible such that, for example, a user could access any smartphone with the APP 304 and log into the system and similarly, the user could establish a session on any client device 310 that has the client application 312.

Figure 7:
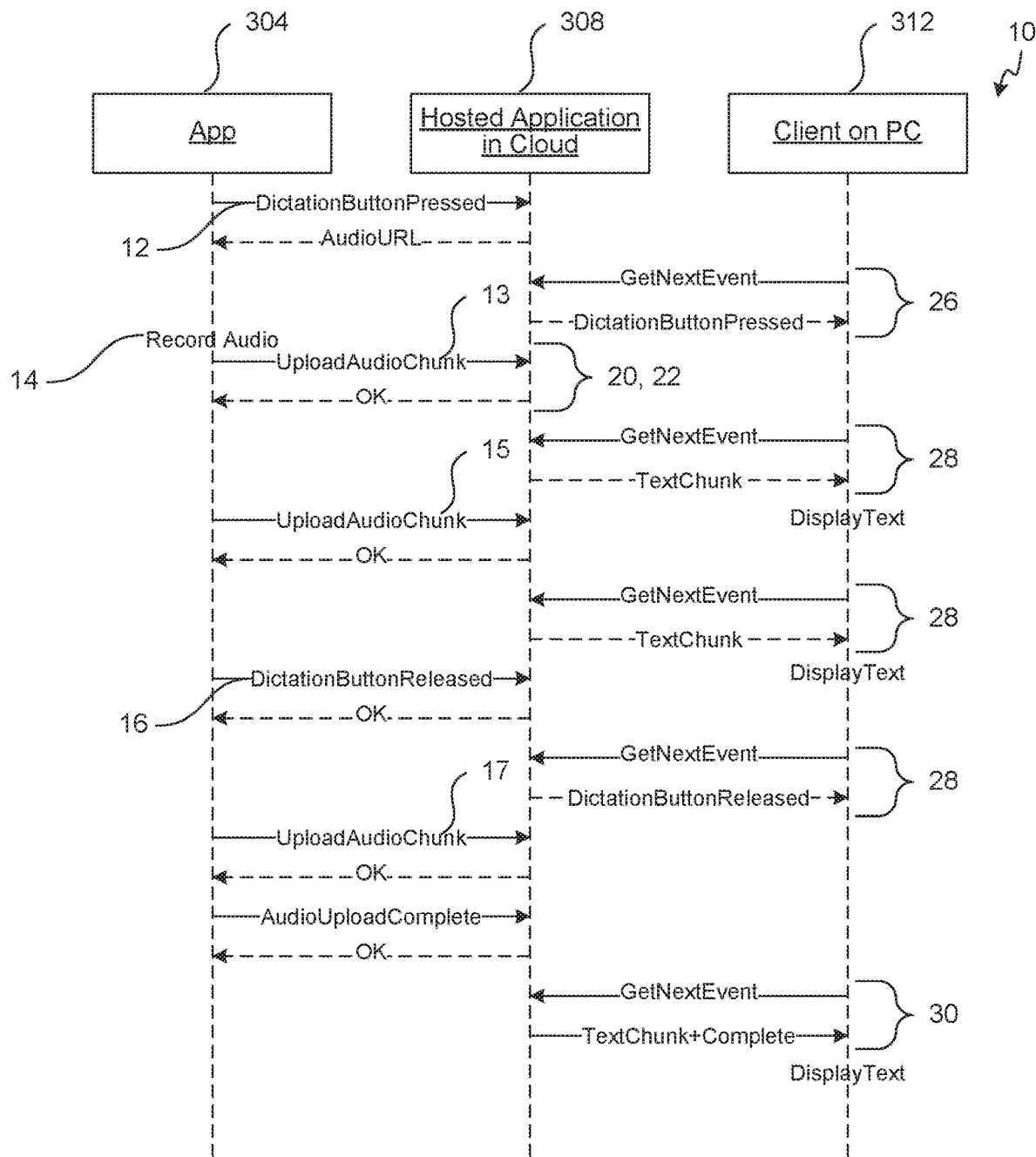
FIG. 7 is a flow/sequence diagram for transmitting audio and data over the cloud based configuration of FIG. 3 consistent with the technology of the present application.

With reference to FIG. 7, a flowchart 10 is provided showing one exemplary methodology for the process flow of dictation, where the user of the wireless microphone 302 dictates to the APP 304 and the transcribed text, which the server 306 hosting the application 308 generates from the dictation, is received by the client application 312 and displayed on the client device 310. The process starts after the above associations. The uploads from the APP 304 and the downloads to the client application 312 described herein can occur at different times, but they are explained together herein generally occurring as the data is streamed from one device to the next, e.g., generally real time, although batch uploads and downloads are possible as well. First, the dictation function of the APP 304 is initiated by, for example, pressing (and holding in some embodiments) a dictation button, such as the record button 414, step 12. The user begins speaking into the wireless microphone 302 to record the dictation, step 14. When the dictation is complete, the user may release the record button 414, step 16. Notice, in certain embodiments instead of pressing and holding the record button 414, the record button may initiate on a first press and release (or tap) and terminate on a second press and release (or tap). The APP 304 notifies the hosted application 308 that it has finished a recording session, step 18.

While the user is recording audio, the APP 304 periodically uploads audio to the hosted application 312, step 13 and 15, shown as being uploaded during the recording and step 17 showing final audio being uploaded subsequent to the termination of the recording. There is not a requirement that the final audio upload occurs subsequent to the stoppage of the recording as the APP 304 may automatically expunge silence at the end of a recording. Rather than uploading chunks, audio may be streamed in certain embodiments.

The hosted application 308 at the server 306 begins receiving the audio, step 20, and transcribes the received audio, step 22. The transcribed audio is queued as corresponding chunks of text, step 24. The client application 312 on the client device 310 periodically polls the hosted application 308 for the next event, step 26, which in this exemplary embodiment is the next chunk of transcribed text. The new text chunks are transmitted (either pushed or pulled) from the hosted application 308 to the client application 312, step 28. In certain embodiments, the transcribed text may be streamed. The client application 312 uses the text as required by the client application 312, such as, for example, displaying the transcribed text. When the transcribed text is all transmitted, the hosted application may notify the client application 312 that the transcription is complete, step 30.

Figure 8:
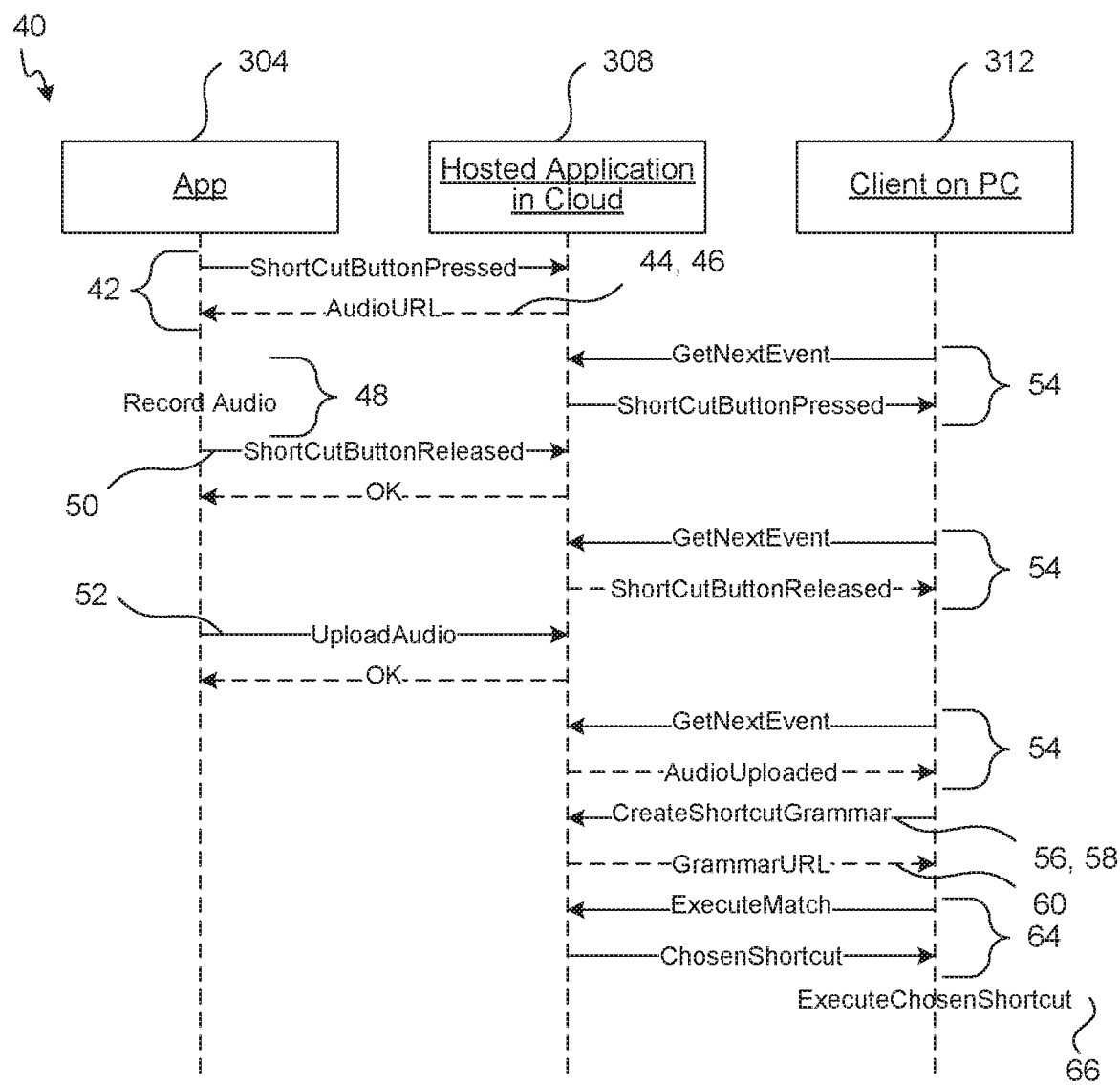
FIG. 8 is a flow/sequence diagram for transmitting an audio shortcut over the cloud based configuration of FIG. 3 consistent with the technology of the present application.

As can now be appreciated, using the wireless microphone 302, which may be a smartphone, it is possible to provide shortcut buttons on the GUI 400, such as, for example, shortcut button 422. As shown in FIG. 8, a flow chart 40 is provided where an audio (or radio button) shortcut may be provided to the client device 310 from the smartphone. In this case, the user presses the shortcut button 422, step 42. The APP 304 notifies the hosted application 308 that the shortcut has been initiated. The hosted application 308 acknowledges the notification, step 44, and returns the link (such as a universal resource located (URL)) of where it will store the audio associated with the shortcut, step 46. Next, the user dictates or speaks the command associated with the shortcut, step 48. When complete, the user releases the shortcut button step 50, which alerts the hosted application 308 that the shortcut is finished. Again, instead of press, hold, release, the buttons can be operated by a tap to initiate and a tap to terminate. The APP 304 next uploads the recorded audio to the storage location in the link provided by the hosted application 308, step 52. Similar to the above, the client application 312 polls (continuously or periodically) the hosted application 308 for the next event, which in this case would be the shortcut rather than a transcribed chunk, step 54. The hosted application 308 notifies the client application 312 that the shortcut button has been depressed and released and the audio has been uploaded into the specified URL. In one embodiment, the client application 312 creates a grammar (i.e., a pattern), step 56, and uploads the grammar to the hosted application 308, step 58. Alternatively, in other embodiments, the hosted application 308 matches the command without getting the grammar from the client application 312. The hosted application 308 responds with a URL for the grammar, step 60. The client application 312 instructs the server to match the audio against the grammar, step 62, and return the matched shortcut command, 64. Once received, the client application 312 and the client device 310 execute the shortcut command, step 66.

Figure 9:
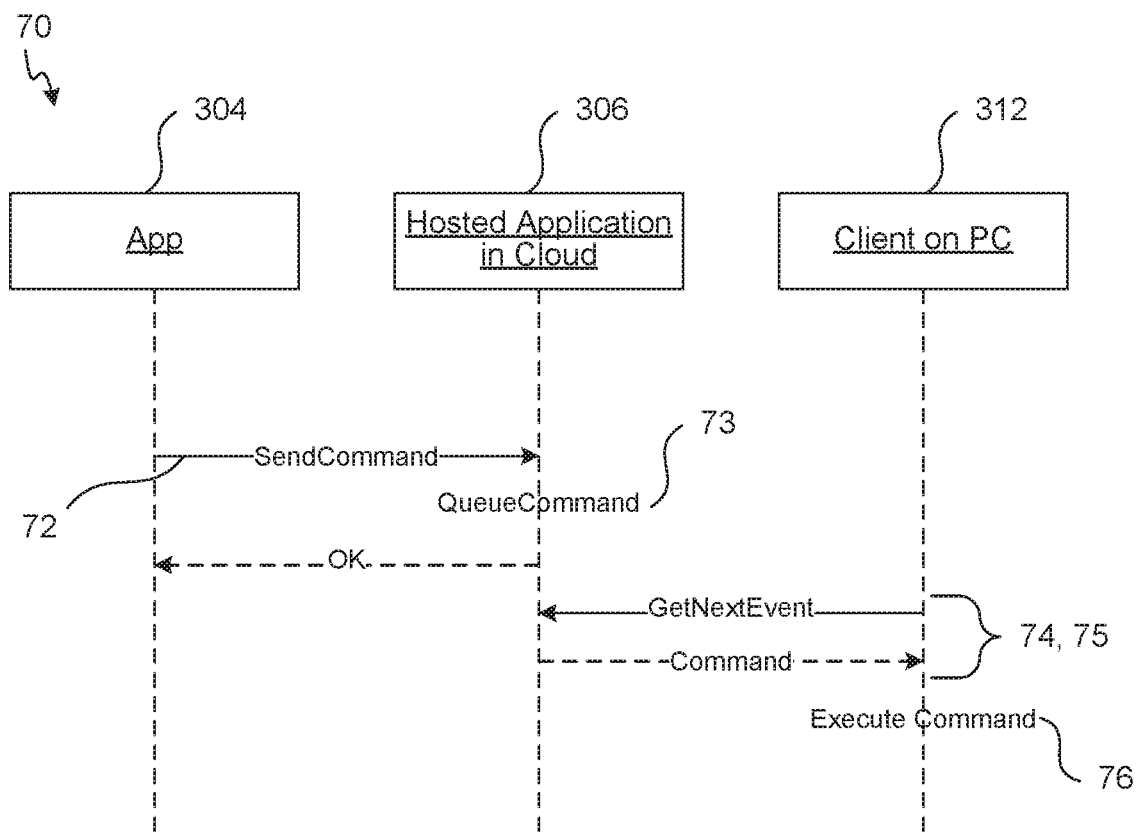
FIG. 9 is a flow/sequence diagram for transmitting commands, keyboard operation, or mouse operation over the cloud based configuration of FIG. 3 consistent with the technology of the present application.
Figure 10:
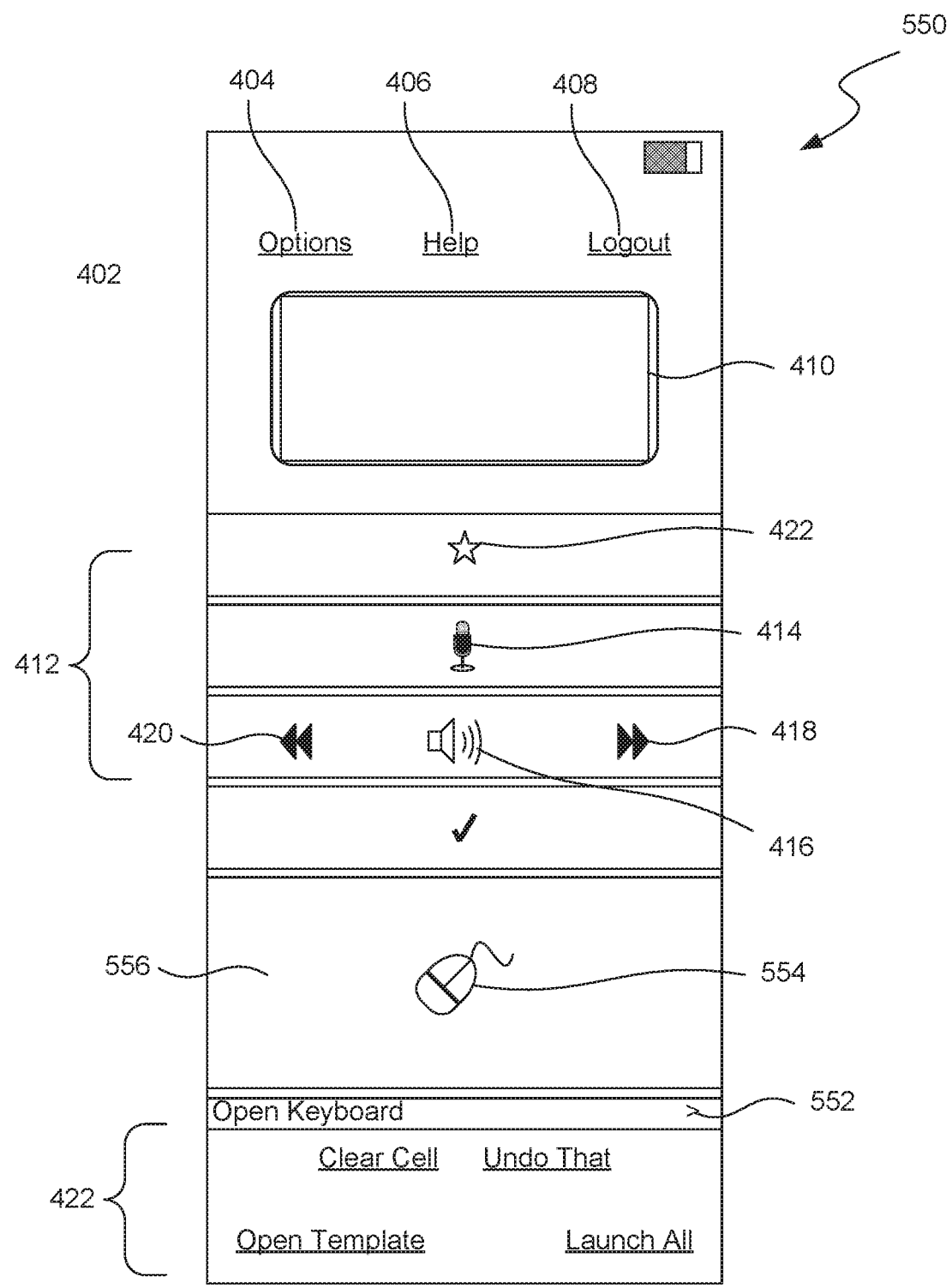
FIG. 10 is a graphical user interface of a wireless keyboard or mouse for transmitting keyboard or mouse commands over the cloud based configuration of FIG. 3 consistent with the technology of the present application.

Similar to the above shortcut command, a user can send commands from the wireless microphone 302 to the client device 310 without a direct communication link between the microphone and the client device. For example, when the wireless microphone 302 is a smartphone (tablet or the like capable of running applications), the smartphone app generally incorporates buttons that may be configured for certain command functions, such as, for example, save file, invoke or initiate an application, or the like. With reference to FIG. 9, a flow chart 70 is shown in which the user of the smartphone may execute commands on the client device 310. First, the button is activated at the smartphone or other configured mobile device, step 72. The command is uploaded by the smartphone via the first communication link 314 to the hosted application 308 on the server 306, step 73. The client application 312 on the client device 310 continuously or periodically polls the hosted application 308 for data, step 74. The data, which in this case is the transmitted command, is downloaded, step 75, over the second communication link 316 and the client application 312 causes the client device 310 to execute the command, step 76. In one exemplary embodiment, a non-touch screen client device can be used as a touch screen device through the wireless device's touch screen commands. As described, the buttons send commands to be executed by the client device 310. Similarly, the wireless microphone 302 such as a smartphone may be configured to send keyboard clicks (function keys, alpha numeric data, or the like), touch screen interactions, or mouse data (such as mouse location and clicking (left or right button for example)). With reference to FIG. 10, a Graphical User Interface (GUI 550) is provide illustrative of an exemplary GUI to transmit mouse movement, for example. GUI 550 is similar to GUI 400. In this case, the user can tap on the "Open Keyboard" button 552 to bring up an onscreen keyboard, which he can click/tap on to enter keys. The typed keys are sent to the server for interpretation. Similarly, GUI 550 has a mouse button 554 and movement field 556. The movement field 556 could be a restricted portion of the touch screen or it could be any portion up to the entire touch screen. Touching the button 554 and wiping the mouse button 554 will cause the mouse to appear and it can be moved around by dragging a finger around the mouse field 556. The mouse events are sent to the server for interpretation. The subsequent clicking and keying of the mouse is generally supported in the art. In other words, there are conventions already known for how to interpret finger taps and drags, including gestures involving multiple fingers. The mouse input GUI 550 would use these already known conventions. As can be appreciated on reading the disclosure, the above provides a "virtual mouse" running as part of a mouse-microphone combination on a wireless phone. This provides an alternative implementation of the functionality offered in handheld microphones. Additionally, the types of input and commands received by the hosted application 308 and transmitted to the client application 312 can be extended to other sensor inputs available from smartphones. For example, the smartphone may have a gyroscope or a series of accelerometers to provide orientation of the smartphone. The movement of the smartphone may provide pointer coordinates for the user that are transmitted as mouse or laser pointers for a presentation. Other sensor devices might be built in to the phone, such as a GPS chip or a peripheral device that is plugged in, such as a medical device, or scientific instrument. The associated APP 304 on the smartphone or tablet is able to gather data from the device and perform sundry other useful tasks, such as presenting the data to the user, providing a means to configure the device, and transmitting the data to the hosted application 308 in the cloud 307. The general scenario provides the user with the ability to use a different computer from the mobile device display to view and interact with the data gathered by the device and associated APP. The data is transmitted to the hosted application of the cloud and the user interacts with the mobile device and APP while the client application on the client device, such as a laptop, or desktop, or tablet computer, provides an enhanced display.

Figure 11:
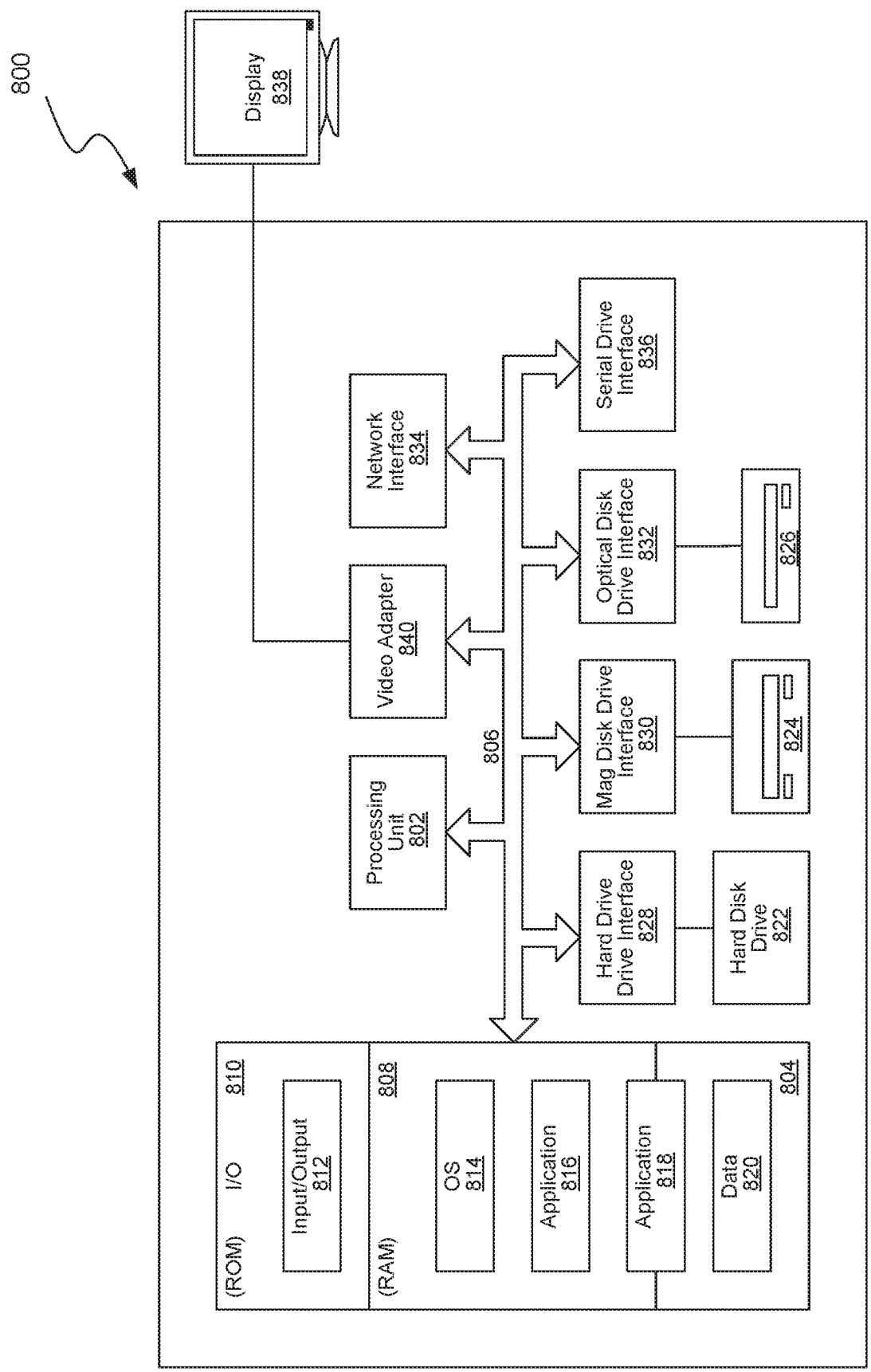
FIG. 11 is a functional block diagram of a device on which the technology of the present application may be implemented.

Referring now to FIG. 11, a functional block diagram of a typical machine capable of incorporating the technical solutions of the present application. The machine may be the wireless microphone, thin or thick client, server of the like. The client device 800 for the technology of the present application is provided. Client device 800 is shown as a single, contained unit, such as, for example, a desktop, laptop, handheld, or mobile processor, but client device 800 may comprise portions that are remote and connectable via network connection such as via a LAN, a WAN, a WLAN, a Wi-Fi Network, Internet, or the like. The client device 800 could be associated with the wireless microphone 302, the server 306, or the client device 310. Generally, client device 800 includes a processor 802, a system memory 804, and a system bus 806. System bus 806 couples the various system components and allows data and control signals to be exchanged between the components. System bus 806 could operate on any number of conventional bus protocols. System memory 804 generally comprises both a random access memory (RAM) 808 and a read only memory (ROM) 810. ROM 810 generally stores a basic operating information system such as a basic input/output system (BIOS) 812. RAM 808 often contains the basic operating system (OS) 814, application software 816 and 818, and data 820. System memory 804 contains the code for executing the functions and processing the data as described herein to allow the present technology of the present application to function as described. Client device 800 generally includes one or more of a hard disk drive 822 (which also includes flash drives, solid state drives, and etc. as well as other volatile and non-volatile memory configurations), a magnetic disk drive 824, or an optical disk drive 826. The drives also may include zip drives and other portable devices with memory capability. The drives are connected to the bus 806 via a hard disk drive interface 828, a magnetic disk drive interface 830 and an optical disk drive interface 832, etc. Application modules and data may be stored on a disk, such as, for example, a hard disk installed in the hard disk drive (not shown). Client device 800 has network connection 834 to connect to a local area network (LAN), a wireless network, an Ethernet, the Internet, or the like, as well as one or more serial port interfaces 836 to connect to peripherals, such as a mouse, keyboard, modem, or printer. Client device 800 also may have USB ports or wireless components, not shown. Client device 800 typically has a display or monitor 838 connected to bus 806 through an appropriate interface, such as a video adapter 840. Monitor 838 may be used as an input mechanism using a touch screen, a light pen, or the like. On reading this disclosure, those of skill in the art will recognize that many of the components discussed as separate units may be combined into one unit and an individual unit may be split into several different units. Further, the various functions could be contained in one personal computer or spread over several networked personal computers. The identified components may be upgraded and replaced as associated technology improves and advances are made in computing technology. The speech recognition engines may have similar constructions.

As can be appreciated, providing the wireless microphone on a smartphone or other similar mobile device where the microphone and the client device separately communicate with a hosted application is useful for a number of reasons. In one case, for example, the user can move or pace while dictating without worrying about the quality of the audio being received by the hosted application. Also, the user need not worry about a local connection to the client device and, therefore, can continue to dictate even if the user walks some distance away from the client device. Also, in some instances, such as where Wi-Fi or the like is not available, the wireless microphone as a smartphone allows the wireless microphone to use a cellular connection to dictate to a client device that only has a wired connection to the Internet. Additionally, the wireless microphone of the technology of the present application provides a seamless transition between different client devices executing the client application as the microphone is separately connected to the hosted application.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. The above identified components and modules may be superseded by new technologies as advancements to computer technology continue.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method of coordinating network communication between a mobile device running a mobile application and a client device running a client application through a server running a speech to text application, the method comprising:
   obtaining credential information of a user of a client application executing on the client device at the server running the speech to text application;
   registering the user with the speech to text application executing on the server
   identifying a mobile device for the user to communicate on a first communication link with the speech to text application executing on the server;
   receiving, from the mobile device over the first communication link, data by the speech to text application on the server, wherein the data comprises an audio shortcut;
   processing the data by the speech to text application executing at the server;
   transmitting, over a second communication link to the client application executing on the client device, a result of the data processed by the speech to text application,
      wherein the result of the data comprises a shortcut command to be executed by the client application executing on the client device,
      wherein the shortcut command corresponds to the audio shortcut,
      wherein the data was received from the mobile device of the user on the first communication link, and
      wherein the first and second communication links contain at least one different resource locater.

2. The method of claim 1,
   wherein the data received from the mobile device is audio and the processed data transmitted by the hosted application is text,
   wherein the client application provides a graphical user interface that has fields populated by the text,
   wherein the graphical user interface is an electronic health record application, and
   wherein the graphical user interface is a customer relationship management application.

3. The method of claim 1 wherein the step of identifying the mobile device for the user comprises receiving a credential of the user of the mobile device and the speech to text application further comprises associating the mobile device of the user to the client application of the user.

4. The method of claim 1 wherein the step of identifying the mobile device comprising transmitting a client identifier of the client application of the user to the mobile device and identifying the client identifier in the data received from the mobile device.

5. The method of claim 1 wherein the data received from the mobile device comprises an audio keyboard entry and the processed data transmitted to the client application comprises the keyboard entry.

6. The method of claim 1,
   wherein the data received from the mobile device comprises mouse movement and the processed data transmitted to the client application comprises the mouse movement,
   wherein the data received from the mobile device is audio and the processed data transmitted to the client application is a shortcut or command to be executed by the client application executing on the client device,
   wherein the data received from the mobile device is audio to be matched against a pattern received from the client application and the data transmitted to the client application is a shortcut or command to be executed by the client application executing on the client device, and
   wherein the data received from the mobile device comprises data from a sensor associated with the mobile device and the processed data transmitted to the client comprises the sensor data or a processed version thereof.

7. The method of claim 1 wherein the first communication link uses a cellular connection.

8. The method of claim 1 further comprising:
   receiving a next event request form the client application and wherein the hosted application transmits processed data to the client application on receiving the next event request.

9. The method of claim 1,
   wherein the mobile device comprises a wireless microphone,
   wherein the wireless microphone comprises a smartphone executing a microphone application, and
   wherein the graphical user interface is an enterprise workforce productivity application.

10. A computing system for coordinating network communication between a mobile device running a mobile application and a client device running a client application through a server running a speech to text application, the computing system comprising:
    one or more processors; and
    one or more memories storing instructions that, when executed by the one or more processor, cause the computing system to perform a process comprising:
       obtaining credential information of a user of a client application executing on the client device at the server running the speech to text application;
       registering the user with the speech to text application executing on the server
       identifying a mobile device for the user to communicate on a first communication link with the speech to text application executing on the server;
       receiving, from the mobile device over the first communication link, data by the speech to text application on the server, wherein the data comprises an audio shortcut;
       processing the data by the speech to text application executing at the server;
       transmitting, over a second communication link to the client application executing on the client device, a result of the data processed by the speech to text application,
          wherein the result of the data comprises a shortcut command to be executed by the client application executing on the client device,
          wherein the shortcut command corresponds to the audio shortcut,
          wherein the data was received from the mobile device of the user on the first communication link, and
          wherein the first and second communication links contain at least one different resource locater.

11. The computing system of claim 10,
    wherein the data received from the mobile device is audio and the processed data transmitted by the hosted application is text, wherein the client application provides a graphical user interface that has fields populated by the text, wherein the graphical user interface is an electronic health record application, and wherein the graphical user interface is a customer relationship management application.

12. The computing system of claim 10, wherein the step of identifying the mobile device for the user comprises receiving a credential of the user of the mobile device and the speech to text application further comprises associating the mobile device of the user to the client application of the user.

13. The computing system of claim 10, wherein the step of identifying the mobile device comprising transmitting a client identifier of the client application of the user to the mobile device and identifying the client identifier in the data received from the mobile device.

14. The computing system of claim 10, wherein the data received from the mobile device comprises an audio keyboard entry and the processed data transmitted to the client application comprises the keyboard entry.

15. The computing system of claim 10, wherein the data received from the mobile device comprises mouse movement and the processed data transmitted to the client application comprises the mouse movement, wherein the data received from the mobile device is audio and the processed data transmitted to the client application is a shortcut or command to be executed by the client application executing on the client device, wherein the data received from the mobile device is audio to be matched against a pattern received from the client application and the data transmitted to the client application is a shortcut or command to be executed by the client application executing on the client device, and wherein the data received from the mobile device comprises data from a sensor associated with the mobile device and the processed data transmitted to the client comprises the sensor data or a processed version thereof.

16. The computing system of claim 10, wherein the first communication link uses a cellular connection.

17. The computing system of claim 10, wherein the mobile device comprises a wireless microphone, wherein the wireless microphone comprises a smartphone executing a microphone application, and wherein the graphical user interface is an enterprise workforce productivity application.

18. A non-transitory computer-readable storage medium including a set of instructions that, when executed by one or more processors, causes the one or more processors to perform operations comprising:

obtaining credential information of a user of a client application executing on the client device at the server running the speech to text application;

registering the user with the speech to text application executing on the server identifying a mobile device for the user to communicate on a first communication link with the speech to text application executing on the server;

receiving, from the mobile device over the first communication link, data by the speech to text application on the server, wherein the data comprises an audio shortcut;

processing the data by the speech to text application executing at the server;

transmitting, over a second communication link to the client application executing on the client device, a result of the data processed by the speech to text application, wherein the result of the data comprises a shortcut command to be executed by the client application executing on the client device, wherein the shortcut command corresponds to the audio shortcut, wherein the data was received from the mobile device of the user on the first communication link, and wherein the first and second communication links contain at least one different resource locater.

* * * * *